US012769555B2

(12) United States Patent
Suryanarayana et al.

(10) Patent No.: US 12,769,555 B2
(45) Date of Patent: Oct. 20, 2026

(54) ADAPTIVE CONTEXT AWARE INFORMATION HANDLING SYSTEM STACK TUNING

(71) Applicant: Dell Products L.P., Round Rock, TX (US)

(72) Inventors: Shekar Babu Suryanarayana, Bangalore (IN); Shrirathna K G, Udupi (IN)

(73) Assignee: Dell Products L.P., Round Rock, TX (US)

( * ) Notice: Subject to any disclaimer, the term of this patent is extended or adjusted under 35 U.S.C. 154(b) by 182 days.

(21) Appl. No.: 18/429,579

(22) Filed: Feb. 1, 2024

(65) Prior Publication Data

US 2025/0251941 A1 Aug. 7, 2025

(51) Int. Cl.

| | |
|---|---|
| ***G06F 9/4401*** | (2018.01) |
| ***G06F 8/65*** | (2018.01) |
| ***G06F 9/445*** | (2018.01) |
| ***G06F 15/177*** | (2006.01) |
| ***G06F 21/57*** | (2013.01) |

(52) U.S. Cl.

CPC .......... *G06F 9/4401* (2013.01); *G06F 21/572* (2013.01); *G06F 8/65* (2013.01); *G06F 9/44505* (2013.01); *G06F 15/177* (2013.01)

(58) Field of Classification Search

CPC .. G06F 9/44505; G06F 9/4401; G06F 21/572; G06F 15/177; G06F 8/65

USPC ................................................. 713/1, 2, 100

See application file for complete search history.

(56) References Cited

U.S. PATENT DOCUMENTS

| | | | | |
|---|---|---|---|---|
| 7,574,217 | B1 * | 8/2009 | Leung | H04W 24/02 455/560 |
| 2006/0129795 | A1 * | 6/2006 | Bulusu | G06F 9/4401 713/2 |
| 2011/0218844 | A1 * | 9/2011 | Sugimoto | G06Q 30/0241 705/14.4 |
| 2013/0080752 | A1 * | 3/2013 | Liao | G06F 9/4403 713/1 |
| 2017/0116005 | A1 * | 4/2017 | Oya | G06F 9/44505 |
| 2023/0315449 | A1 * | 10/2023 | Cunningham | G06F 7/24 712/7 |
| 2024/0427610 | A1 * | 12/2024 | Machado | G06F 9/4403 |

OTHER PUBLICATIONS

List of Patents or Applications Treated as Related, Feb. 2024.

* cited by examiner

*Primary Examiner* — Ji H Bae

(74) *Attorney, Agent, or Firm* — Terrile, Cannatti & Chambers, LLP; Stephen A. Terrile

(57) ABSTRACT

A firmware management operation. The firmware management operation includes providing an information handling system with a distributed BIOS, the distributed BIOS including a BIOS component and a BIOS variable; identifying a processor environment installed on an information handling system from a plurality of processor environments; and, performing an information handling system stack tuning operation, the information handling system stack tuning operation providing a set of tuned stack components, the set of tuned stack components being tuned for the processor environment installed on the information handling system.

20 Claims, 11 Drawing Sheets

ADAPTIVE CONTEXT AWARE INFORMATION HANDLING SYSTEM STACK TUNING

BACKGROUND OF THE INVENTION

Field of the Invention

The present invention relates to information handling systems. More specifically, embodiments of the invention relate to performing a firmware management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a computer-implementable method for performing a firmware management operation, comprising: providing an information handling system with a distributed BIOS, the distributed BIOS including a BIOS component and a BIOS variable; identifying a processor environment installed on an information handling system from a plurality of processor environments; and, performing an information handling system stack tuning operation, the information handling system stack tuning operation providing a set of tuned stack components, the set of tuned stack components being tuned for the processor environment installed on the information handling system.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: providing an information handling system with a distributed BIOS, the distributed BIOS including a BIOS component and a BIOS variable; identifying a processor environment installed on an information handling system from a plurality of processor environments; and, performing an information handling system stack tuning operation, the information handling system stack tuning operation providing a set of tuned stack components, the set of tuned stack components being tuned for the processor environment installed on the information handling system.

In another embodiment the invention relates to a computer-readable storage medium embodying computer program code, the computer program code comprising computer executable instructions configured for: providing an information handling system with a distributed BIOS, the distributed BIOS including a BIOS component and a BIOS variable; identifying a processor environment installed on an information handling system from a plurality of processor environments; and, performing an information handling system stack tuning operation, the information handling system stack tuning operation providing a set of tuned stack components, the set of tuned stack components being tuned for the processor environment installed on the information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
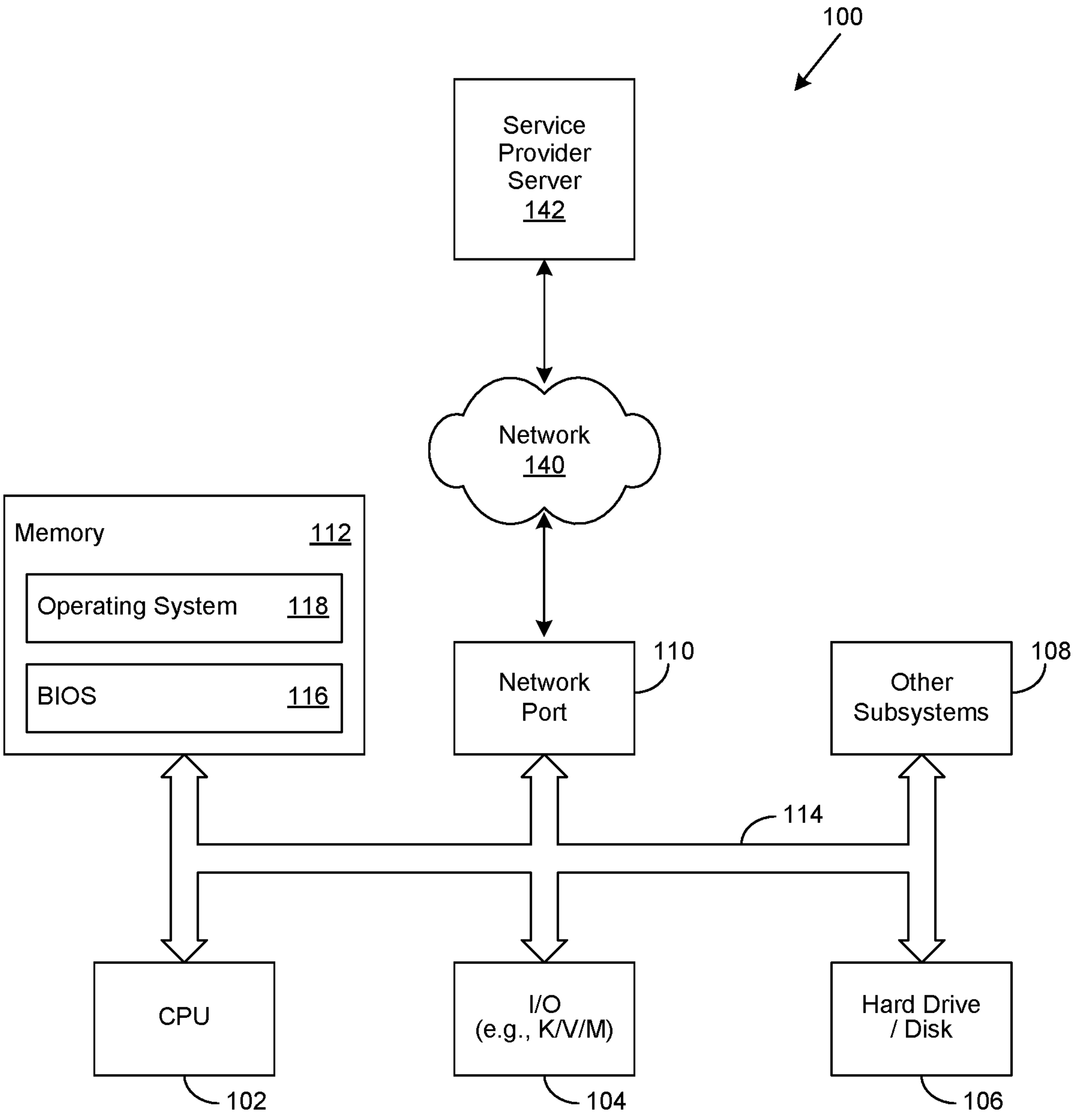
FIG. 1 shows a general illustration of components of an information handling system as implemented in the system and method of the present invention.

A system, method, and computer-readable medium are disclosed for performing a firmware management operation, described in greater detail herein. Various aspects of the invention reflect an appreciation that it is not uncommon for certain firmware components of a Basic Input/Output System (BIOS) associated with an information handling system (IHS) to be added, deleted, updated, revised, replaced, or restored over time. Likewise, various aspects of the invention reflect an appreciation that such BIOS firmware components are often added, deleted, updated, revised, replaced, or restored to provide security updates, fix known software bugs, improve performance, add new features and functionalities, and so forth.

Various aspects of the invention reflect an appreciation that a best known configuration (BKC) for an information handling system often refers to a configuration set defined for information handling system components which are aligned to provide seamless performance of the information handling system. Various aspects of the present disclosure include an appreciation that the information handling system components can include firmware components, operating system driver components, processor environment drivers, etc. Post run time services due to various update releases and failing for timely updates can result in mis-alignments in a best known configuration software stack which can result in poor system performance, field issues, or a combination thereof.

Various aspects of the present invention include an appreciation that often processor environment drivers are not automatically tuned for a particular processor environment. Various aspects of the present disclosure include an appreciation that a processor driver not being correctly tuned can result in slower network operations, poor system performance, field issues, or a combination thereof.

Various aspects of the present invention include an appreciation that an inadequately tuned software stack can result in a display function being disabled due, for example, to video frame cycle misalignment. Various aspects of the present disclosure that when a display function is disabled, a system reboot is often required to regain normal experience. Various aspects of the present invention include an appreciation that an inadequately tuned software stack can result in an unsynchronized dock firmware update with BIOS. Various aspects of the present invention include an appreciation that an unsynchronized dock firmware update with BIOS can cause video rendering and keyboard/mouse issues.

Various aspects of the present invention include an appreciation that an inadequately tuned software stack can result in untuned processor clocking and memory frequency Various aspects of the present invention include an appreciation that an inadequately tuned software stack can result in untuned processor clocking and memory frequency can lead to firmware update failures as the memory refresh cycle may corrupt the firmware payload. Various aspects of the present invention include an appreciation that one example of an inadequately tuned software stack is an incorrect version of a processor environment driver not supporting processor throttling. In this example, a misalignment of 'QuadIO Enabled' feature with a processor environment microcode supporting 'Fast Read Clock Frequency' can result in a miss aligned best known configuration stack scenario which leads to unexpected behavior of information handling system.

A system and method are disclosed for performing a context aware stack tuning operation. In certain embodiments, a stack tuning system performs the context aware stack tuning operation. In certain embodiments, the context aware stack tuning operation includes a dynamic learning method (DLM) which learns various platform capabilities like operating system drivers, processor environment specific firmware, etc. that can influence runtime execution. In certain embodiments, the dynamic learning method generates a best known configuration alignment policy. In certain embodiments, the dynamic learning method publishes the best known configuration alignment policy for use by other information handling systems conforming to similar information handling system policy architectures.

In certain embodiments, the context aware stack tuning operation uses an adaptive best known configuration tuning protocol. In certain embodiments, the adaptive best known configuration tuning protocol allows the context aware stack tuning operation to perform seamless updates. In certain embodiments, the seamless updates automatically tune the best known configuration parameters of the information handling system.

In certain embodiments, the context aware stack tuning operation uses an embedded controller to perform seamless updates. In certain embodiments, the embedded controller performs an out of band non-volatile memory connect operation. In certain embodiments, the embedded controller accesses remote storage (e.g., via cloud synchronization) upon activation of a best known configuration update trigger. In certain embodiments, the context aware stack tuning operation incorporates a cloud module which facilitates alignment of tuned stack information across a plurality of information technology (IT) environments. In certain embodiments, by the context aware stack tuning operation uses an embedded controller which performs an out of band non-volatile memory connect operation. In certain embodiments, the embedded controller includes an out of band non-volatile memory interface. In certain embodiments, the out of band non-volatile memory interface auto triggers a best known configuration update.

In certain embodiments, the context aware stack tuning operation is processor environment agnostic. In certain embodiments, the best known configuration policy seamlessly triggers best known configuration updates. In certain embodiments, the context aware stack tuning operation resolves power on self test (POST) and system performance issues for the information handling system. In certain embodiments, the context aware stack tuning operation includes a protocol designed to align all modules and respective updates. In certain embodiments, the protocol is executed in a pre-boot environment. In certain embodiments, the protocol allows seamless and enhanced user-experience.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system that can be used to implement the system and method of the present invention. In certain embodiments, the information handling system (IHS) 100 may be implemented to include a processor (e.g., central processor unit or "CPU") 102, various input/output (I/O) devices 104, such as a display, a keyboard, a mouse, a touchpad, or a touchscreen, and associated controllers, a hard drive or disk storage 106, and various other subsystems 108. In various embodiments, the IHS 100 may also be implemented to include a network port 110 operable to connect to a network 140, which in turn may be implemented to provide access to a service provider server 142. In various embodiments, the IHS 100 may likewise be implemented to include system memory 112, which is interconnected to the foregoing via one or more buses 114.

In various embodiments, system memory 112 may be configured to store program code, or data, or both, which in turn may be implemented to be accessible and executable by the CPU 102. In various embodiments, system memory 112 may be implemented using any suitable memory technology. Examples of such memory technology include random access memory (RAM), static RAM (SRAM), dynamic RAM (DRAM), synchronous dynamic RAM (SDRAM), non-volatile RAM (NVRAM), read-only memory (ROM), erasable programmable read-only memory (EPROM), electrically erasable programmable ROM (EEPROM), complementary metal-oxide-semiconductor (CMOS) memory, flash memory, or any other type of computer memory, whether it may be volatile or non-volatile. In various embodiments, system memory 112 may include one or more dual in-line memory modules (DIMMs), each containing one or more RAM modules mounted onto an integrated circuit board.

In various embodiments the system memory 112 may further be implemented to include a Basic Input/Output System (BIOS) 116, or an operating system (OS) 118, or both. Skilled practitioners of the art will be aware that BIOS 116, also known as System BIOS, ROM BIOS, or personal computer (PC) BIOS, is a type of firmware used to provide runtime services for an OS 118 to perform hardware initialization during the booting process of an IHS 100. Those of skill in the art will likewise be aware that firmware is a combination of persistent memory, program code, and data that provides low-level control of an IHS's 100 hardware. In various embodiments, the BIOS 116 may be implemented to initialize and test certain hardware components of its associated IHS 100 during the booting process (e.g., Power-On Self-Test, or "POST"), followed by loading a boot loader from a particular mass storage device, which in turn may then be used to initialize a kernel.

In various embodiments, such BIOS 116 firmware may be implemented to provide hardware abstraction services to higher-level software such as an OS 118. In various embodiments, BIOS 116 firmware may be implemented in a less complex IHS 100 as an OS 118, performing all control, monitoring, and data manipulation functions. In various embodiments, certain components of a particular IHS 100 may be implemented to have its own firmware, which may store operational variables, data structures, or in general, any sort of information.

In various embodiments, NVRAM may be implemented to store a BIOS 116 associated with the IHS 100. In various embodiments, the NVRAM may also be implemented to hold the initial processor instructions required to bootstrap the IHS 100, store calibration constants, passwords, or setup information, or a combination thereof. In various embodiments, such setup information may be stored as variables in the NVRAM such that the variables are available during system boot from a power-off state. Various embodiments of the invention reflect an appreciation that such variables may need to be modified, revised, updated, restored, or replaced from time to time if they become corrupted. In various embodiments, an NVRAM driver may be implemented to use NVRAM headers to initialize and enable read/write services for updating or restoring such variables. Accordingly, as it relates to various embodiments of the invention, the terms "firmware," "NVRAM," or "BIOS" may be used generically and interchangeably. In various embodiments, the functionality of a BIOS 116 may be implemented according to the Unified Extensible Firmware Interface (UEFI) specification, which describes how an IHS's 100 firmware interacts with a particular OS 118. Various embodiments of the invention reflect an appreciation that UEFI, as typically implemented, may offer certain features and benefits that are not available from traditional BIOS 116 implementations, such as faster boot times, improved security, support for larger storage devices, and higher definition graphical user interfaces (GUIs). In addition, UEFI stores all data related to the IHS's 100 initialization and startup within an .efi file, rather than on its associated firmware. In typical implementations, the .efi file may be stored on a special memory partition known as an EFI System Partition (ESP), which also contains the IHS's 100 bootloader.

In various embodiments, BIOS 116 may be instantiated as a distributed BIOS 116. As used herein, a distributed BIOS 116 broadly refers to a BIOS 116 that includes a plurality of BIOS 116 components, or a plurality of BIOS 116 variables, or a plurality of BIOS 116 storage locations, or a combination thereof. In various embodiments, the distributed BIOS 116 may be implemented to function with any of a plurality of processor environments, described in greater detail herein.

In various embodiments, the IHS 100 may be implemented to perform a firmware management operation. As used herein, a firmware management operation broadly refers to any task, function, operation, procedure, or process performed, directly or indirectly, to store, retrieve, aggregate, disaggregate, add, delete, modify, revise, update, replace, or restore one or more individual BIOS 116 components, described in greater detail herein, or one or more individual BIOS 116 variables, likewise described in greater detail herein, or a combination thereof, in one or more memory 112 locations associated with a particular IHS 100. In certain embodiments, the firmware management operation may be performed during operation of an IHS 100. In various embodiments, performance of the firmware management operation may result in the realization of improved operation of an IHS 100.

Figure 2:
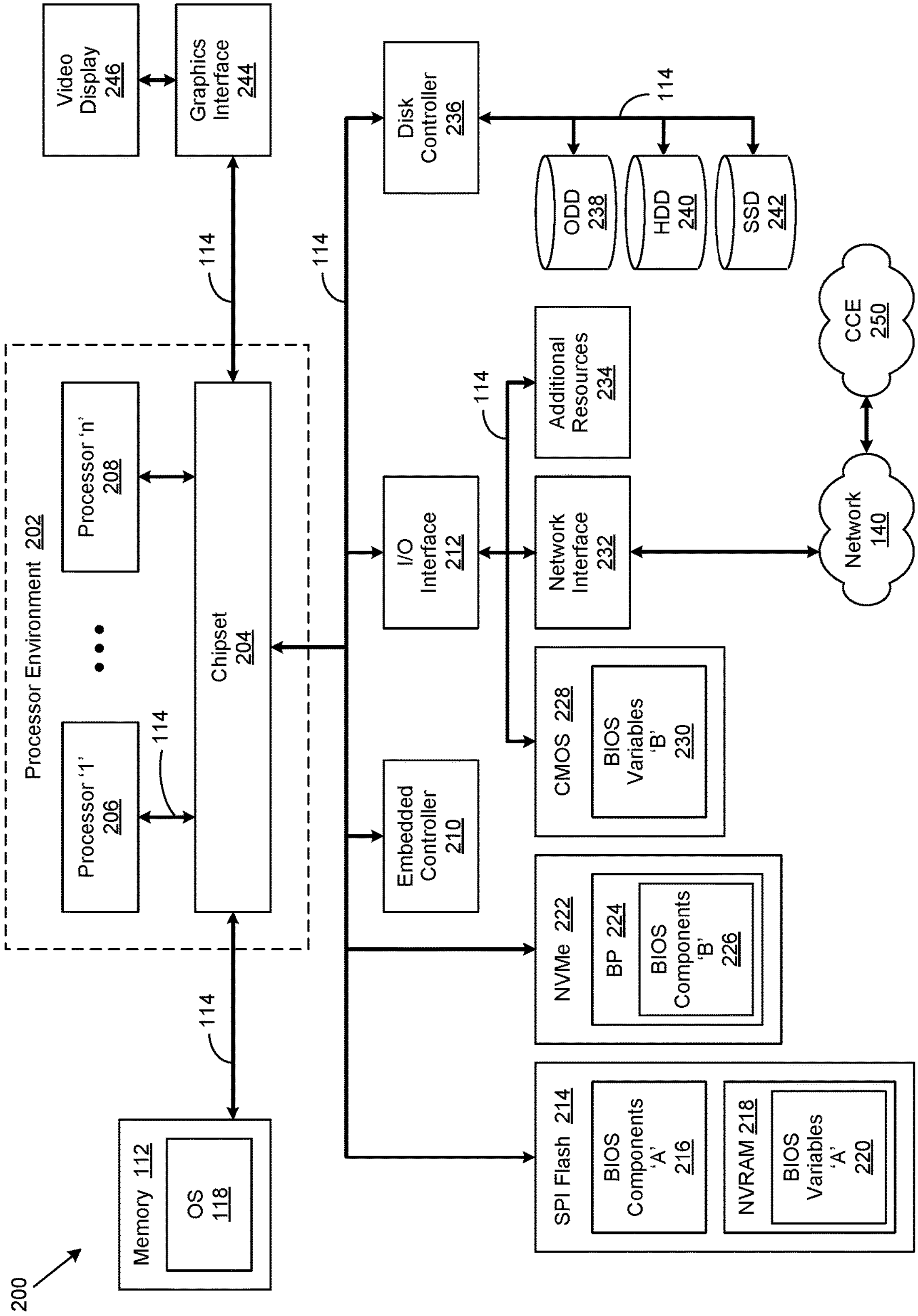
FIG. 2 shows a simplified block diagram of multi-processor operating environment.

FIG. 2 shows a simplified block diagram of multi-processor operating environment implemented in accordance with an embodiment of the invention. As used herein, a multi-processor operating environment 200, such as that shown in FIG. 2, broadly refers to any instrumentality, or aggregate of instrumentalities, that may be implemented to compute, classify, process, transmit, receive, retrieve, originate, switch, store, display, manifest, detect, record, reproduce, handle, or utilize, or a combination thereof, any form of information, intelligence, or data for business, scientific, control, entertainment, or other purpose, through the use of a particular processor environment (PE) 202. For example, the multi-processor environment 200 may be implemented as a personal computer, a laptop computer, a smart phone, a tablet computer or other consumer electronic device, a network server, a network storage device, or other network communication device, and so forth. In various embodiments, a multi-processor operating environment 200 may be implemented to include processing resources for executing machine-executable code, such as a central processing unit (CPU), a programmable logic array (PLA), an embedded device such as a System-on-a-Chip (SoC), or other control logic hardware.

In various embodiments, the multi-processor operating environment 200 may be implemented to include a PE 202. In various embodiments, the PE 202 may be implemented to include a chipset 204 and one or more processors '1' 206 through 'n' 208. In various embodiments, the processors '1' 206 through 'n' 208 implemented within a PE 202 may have the same, or different, architectures. In various embodiments, a chipset 204 may be implemented to support one or more architectures corresponding to the processors '1' 206 through 'n' 208.

As an example, processors '1' 206 through 'n' 208 of a particular PE 202 may be implemented to be the same in a server. In this example, each processor may be assigned to be a resource to one or more virtual machines (VMs). As another example, processor '1' 206 may be implemented as a multi-core processor in a graphics work station, while processor 'n' 208 may be implemented a Graphics Processing Unit (GPU), familiar to skilled practitioners of the art.

In various embodiments, each of the processors '1' 206 through 'n' 208 of a particular PE 202 may be implemented to run the same OS 118. Likewise, individual processors '1' 206 through 'n' 208 of a particular PE 202 may be implemented in various embodiments to run a different same OS 118. For example, processor '1' 206 may be implemented to run Microsoft® Windows®, while processor 'n' 208 may be implemented to run a version of Linux®.

In various embodiments, one or more PEs 202 selected from a plurality of PEs 202 may be implemented within the multi-processor operating environment 200. In certain of these embodiments, a particular PE 202 selected from a plurality of PEs 202 may be vendor-specific. In various embodiments, a particular PE 202 selected from a plurality of PEs 202 may be implemented as a System on a Chip (SoC), familiar to those of skill in the art. In various embodiments, the PE 202 may be implemented to include a plurality of vendor-specific SoCs provided by different vendors, or different versions of an SoC provided by the same vendor.

In various embodiments, the multi-processor operating environment 200 may likewise be implemented to include system memory 112. In various embodiments, the system memory 112 may in turn be implemented to include an operating system (OS) 118. In various embodiments, the multi-processor operating environment 200 may be implemented to include an embedded controller (EC) 210, an input/output (I/O) interface 212, a disk controller 236, and a graphics interface 244, or a combination thereof.

In various embodiments, the multi-processor operating environment 200 may likewise be implemented to include Nonvolatile Random Access Memory (NVRAM) 218, Serial Peripheral Interface (SPI) Flash memory 214, Nonvolatile Memory Express (NVMe) 222 memory, and a complementary metal-oxide-semiconductor (CMOS) 228 chip, or a combination thereof. Skilled practitioners of the art will be familiar with NVRAM 218, which in general usage broadly refers to Random Access Memory (RAM) that retains data if power is lost. In various embodiments, NVRAM 218 may be implemented to hold initial processor instructions used to bootstrap an information handling system (IHS), described in greater detail herein. In various embodiments, NVRAM 218 may be implemented in the form of flash memory, such as SPI Flash 214 memory, Erasable Programmable Read-Only Memory (EPROM), Electrically Erasable Programmable Read-Only Memory (EEPROM), or Ferroelectric RAM (F-RAM), Magnetoresistive RAM (MRAM), Phase-Change RAM (PRAM), or a combination thereof.

Those of skill in the art will likewise be familiar with SPI Flash 214 memory, which is a type of EEPROM memory implemented in accordance with the SPI standard, where the data stored within it is architecturally arranged in blocks. Various embodiments of the invention reflect an appreciation that while data stored within SPI Flash memory 214 is erased at the block level, it may be read or written at the byte level. Likewise, various embodiments of the invention reflect an appreciation that the ability to erase blocks of data within SPI Flash 214 memory may be advantageous in certain embodiments as erase speeds can be improved, and as a result, allow information to be stored more efficiently and compactly.

Likewise, skilled practitioners of the art will be familiar with NVMe, which is an open, logical device interface specification for accessing non-volatile storage media implemented within an IHS. Certain embodiments of the invention reflect an appreciation that NVMe 222 memory is currently available in various form factors, such as solid state drives (SSDs), Peripheral Component Interconnect Express (PCIe) memory cards, and M.2 memory cards. Various embodiments of the invention likewise reflect an appreciation that NVMe, as a logical device interface, is able to support low latency and internal parallelism for solid state storage devices, which can reduce Input/Output (I/O) overhead while providing other known performance improvements.

In various embodiments, the SPI Flash 214 memory may be implemented to receive, store, manage, and provide access to one or more Basic Input/Output System (BIOS) components 'A' 216. As used herein, a BIOS component broadly refers to one or more discrete portions of firmware program code that may be used, directly or indirectly, by a BIOS during its operation. In various embodiments, the SPI Flash 214 memory may be implemented to include certain NVRAM 218 memory. In various embodiments, the NVRAM 218 memory may in turn be implemented to receive, store, manage, and provide access to one or more BIOS variables 'A' 220, such as configuration settings, for use by the BIOS of an associated IHS.

In various embodiments, the NVMe 222 memory may be implemented to include a boot partition (BP) 224. Those of skill in the art will be familiar with the concept of a BP 224, which in common usage broadly refers to a primary memory partition that contains a boot loader, which is a portion of program code responsible for booting the OS 118 of an associated IHS. In various embodiments, the BP 224 may in turn be implemented to receive, store, manage, and provide access to one or more BIOS components 'B' 226. In various embodiments, the NVMe 222 memory may be implemented without a BP 224. Nonetheless, the NVMe 222 memory may be implemented in certain of these embodiments to still receive, store, manage, and provide access to one or more BIOS components 'B' 226.

In various embodiments, the I/O interface 212 may be implemented to interact with a complementary metal-oxide semiconductor (CMOS) 228 chip. In various embodiments, the CMOS 228 chip may be implemented to include a real-time clock and RAM memory that is backed-up by a battery. In various embodiments, the memory in the CMOS 228 chip may be implemented to receive, store, manage, and provide access to one or more BIOS variables 'B' 230.

In various embodiments, the I/O interface 212 may likewise be implemented to interact with a network interface 232, or additional resources 234. or both. In various embodiments, the network interface 232 may be implemented to provide access and connectivity to a network 140. In turn, the network 140 may be implemented in various embodiments to provide access and connectivity to a cloud computing environment (CCE) 250. Skilled practitioners of the art will be familiar with cloud computing, which is defined by the National Institute of Standards and Technology (NIST) as a model for enabling ubiquitous, convenient, on-demand network access to a shared pool of configurable computing resources (e.g., networks, servers, storage, applications, portions of program code, firmware components, data, services, and so forth) that can be rapidly provisioned and released with minimal management effort or service provider interaction. In various embodiments, additional resources 234 may include a data storage system, additional graphics interfaces, a network interface card (NIC), a sound or video processing card, and so forth. In various embodiments, additional resources 234 may be implemented on a main circuit board of an IHS, or a separate circuit board or add-in card thereof, or a device that is external to the IHS, or a combination thereof. In various embodiments, the disk controller 236 may be implemented to interact with, and manage access to and from, an optical disk drive (ODD) 238, a hard disk drive (HDD) 240, or a solid state drive (SSD) 242, or a combination thereof.

In various embodiments, the graphics interface 242 may be implemented to present visual content on an associated video display. In certain of these embodiments, the graphics interface 242 may likewise be implemented to receive user gesture input from the video display 244, such as through the use of a touch-sensitive screen. In various embodiments, the system memory 112, the chipset 204, one or more processors ‘1’ 206 through ‘n’ 208, the EC 210, the SPI Flash 214 memory, the NVMe 222 memory, the I/O interface 212, the CMOS 228 chip, the network interface 232, the additional resources 234, the disk controller 236, the ODD 238, the HDD 240, the SSD 242, the graphics interface 244, and the video display 246 may be implemented to provide and receive data to and from one another via one or more buses 114.

In various embodiments, a firmware management operation may be implemented to include a distributed firmware management operation. As used herein, a distributed firmware management operation broadly refers to a firmware management operation, described in greater detail herein, performed directly, or indirectly, within a multi-processor operating environment 200 to store, retrieve, aggregate, disaggregate, add, delete, modify, revise, update, replace, or restore one or more BIOS components ‘A’ 216 or ‘B’ 226, or one or more BIOS variables ‘A’ 220 or ‘B’ 230, or a combination thereof. In various embodiments, one or more BIOS components ‘A’ 216 or ‘B’ 226, or one or more BIOS variables ‘A’ 220 or ‘B’ 230, or a combination thereof, may be used, individually or in combination with one another, in the performance of a distributed firmware management operation. In various embodiments, performance of the distributed firmware management operation effectively decouples (i.e., minimizes the interrelationship between) one or more BIOS components ‘A’ 216 or ‘B’ 226, or one or more BIOS variables ‘A’ 220 or ‘B’ 230, or a combination thereof, from each other. In various embodiments, the performance of the distributed firmware management operation effectively decouples PE BIOS components from other platform BIOS components, as described herein.

In various embodiments, individual BIOS components ‘A’ 216 or ‘B’ 226 used in the performance of one or more distributed firmware management operations may be located within, or outside of, the multi-processor operating environment 200. As an example, a particular BIOS component ‘A’ 216 or ‘B’ 226 may initially be stored within a cloud computing environment (CCE) 250, described in greater detail herein. In this example, the firmware component may be retrieved from the CCE 250 by the multi-processor operating environment 200 and then respectively stored as firmware components ‘A’ 216 in NVRAM 218, or ‘B’ 226 in NVMe 222 memory, or a combination of the two.

Figure 3:
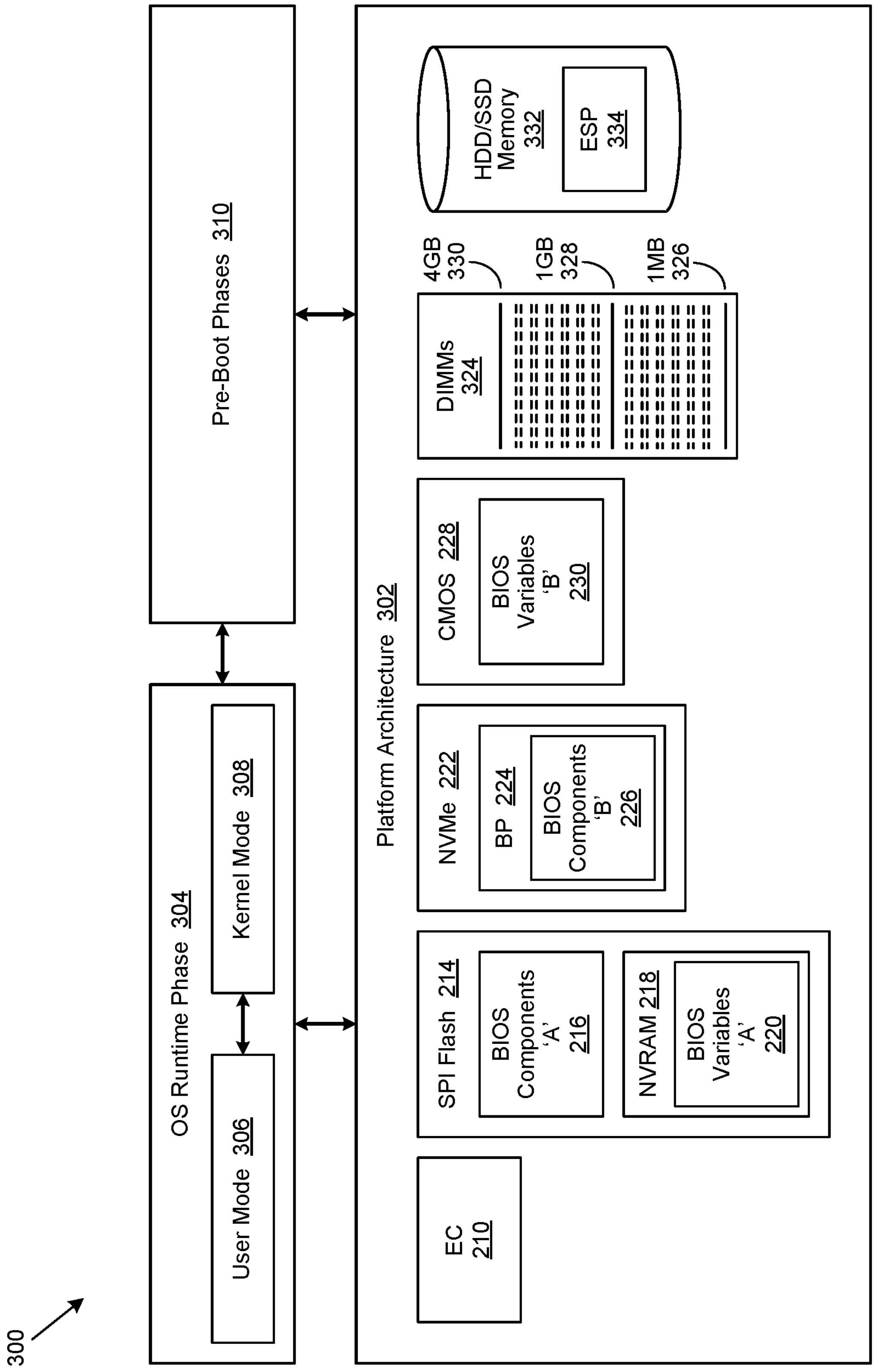
FIG. 3 shows a simplified block diagram of an architecture-specific distributed firmware management platform.

FIG. 3 shows a simplified block diagram of an architecture-specific distributed firmware management platform implemented in accordance with an embodiment of the invention. In various embodiments, the architecture-specific distributed firmware management platform (ASDFMP) 300, and its associated operation, may be implemented to accommodate architecture-specific aspects of a particular information handling system (IHS), described in greater detail herein. As an example, various IHS’s may utilize different processors (e.g., Intel®, AMD®, Qualcom®, Broadcom®, Nvidia®, and so forth), and as a result, may require the use of a Basic Input/Output System (BIOS) specific to their respective architecture, or associated operating system (OS), or both, at boot time. In various embodiments, the ASDFMP 300 may be implemented to perform one or more firmware management operations, described in greater detail herein.

In various embodiments, the ASDFMP 300 may be implemented to include a platform architecture 302. In certain of these embodiments, the platform architecture 302 may be implemented to include an embedded controller (EC) 210, Serial Peripheral Interface (SPI) Flash 214 memory, Non-volatile Memory Express (NVMe) 222 memory, and a complementary metal-oxide-semiconductor (CMOS) 228 chip, or a combination thereof, as described in greater detail herein. In various embodiments, the platform architecture 302 may likewise be implemented to include one or more dual in-line memory modules (DIMMs) 324, and certain hard disk drive (HDD) memory, or solid state drive (SSD) memory, or a combination of the two 332.

In various embodiments, the SPI Flash 214 memory may be implemented to receive, store, manage, and provide access to one or more BIOS components ‘A’ 216, as described in greater detail herein. In various embodiments, the SPI Flash 214 memory may likewise be implemented to include certain NVRAM 218 memory. In various embodiments, the NVRAM 218 memory may in turn be implemented to receive, store, manage, and provide access to one or more BIOS variables ‘A’ 220, as described in greater detail herein.

In various embodiments, the NVMe 222 memory may be implemented to include a boot partition (BP) 224, described in greater detail herein. In various embodiments, the BP 224 may in turn be implemented to receive, store, and provide access to, one or more BIOS components ‘B’ 226. In various embodiments, the NVMe 222 memory may be implemented without a BP 224. Nonetheless, the NVMe 222 memory may be implemented in certain of these embodiments to still receive, store, manage, and provide access to one or more BIOS components ‘B’ 226. In various embodiments, as likewise described in greater detail herein, the CMOS 228 chip may be implemented to receive, store, and provide access to, one or more BIOS variables ‘B’ 230.

In various embodiments, the one or more DIMMs 324 may be implemented to include one or more RAM modules mounted onto an integrated circuit board. In various embodiments, the one or more DIMMs 324 may be partitioned into a low region of memory, such as from 1 megabyte (MB) 326 to 1 gigabyte (GB) 328, and a high region of memory, such as from 1 GB 328 to 4 GB 330. In these embodiments, the amount of memory allocated to the low and high memory regions, the memory addresses within the one or more DIMMs 324 where such allocation may occur, and how such allocation may be performed, is a matter of design choice.

In various embodiments, the HDD/SDD memory 332 may be implemented to include an extensible firmware interface (EFI) system partition (ESP) 334. Skilled practitioners of the art will be familiar with an ESP 334, which is usually implemented as a partition on a mass storage device, such as HDD/SSD memory 332, which in turn is used by an associated IHS implemented with a Unified Extensible Firmware Interface (UEFI), described in greater detail herein. In such implementations, the UEFI loads files stored within the ESP 334 to begin installing Operating System (OS) and associated utility files. In various embodiments, the ESP 334 may be implemented to contain the boot loaders, or kernel images, for all installed OS's that may be contained in other memory partitions, device driver files for hardware devices present in its associated IHS and used by the firmware at boot time, system utility programs that are intended to be run before a particular OS is booted, and data files such as error logs.

In various embodiments, the ASDFMP 300 may be implemented to include an OS runtime phase 304, and various pre-boot phases 310, all of which are described in greater detail herein. In various embodiments, the OS runtime phase 304 may be implemented to include a user mode 306 and a kernel mode 308, both of which are likewise described in greater detail herein. In various embodiments, certain components, processes, or operations, or a combination thereof, respectively associated with the OS runtime phase 304 and the pre-boot phases 310, may be implemented to interact with various components of the platform architecture 302, as likewise described in greater detail herein.

Figure 4A:
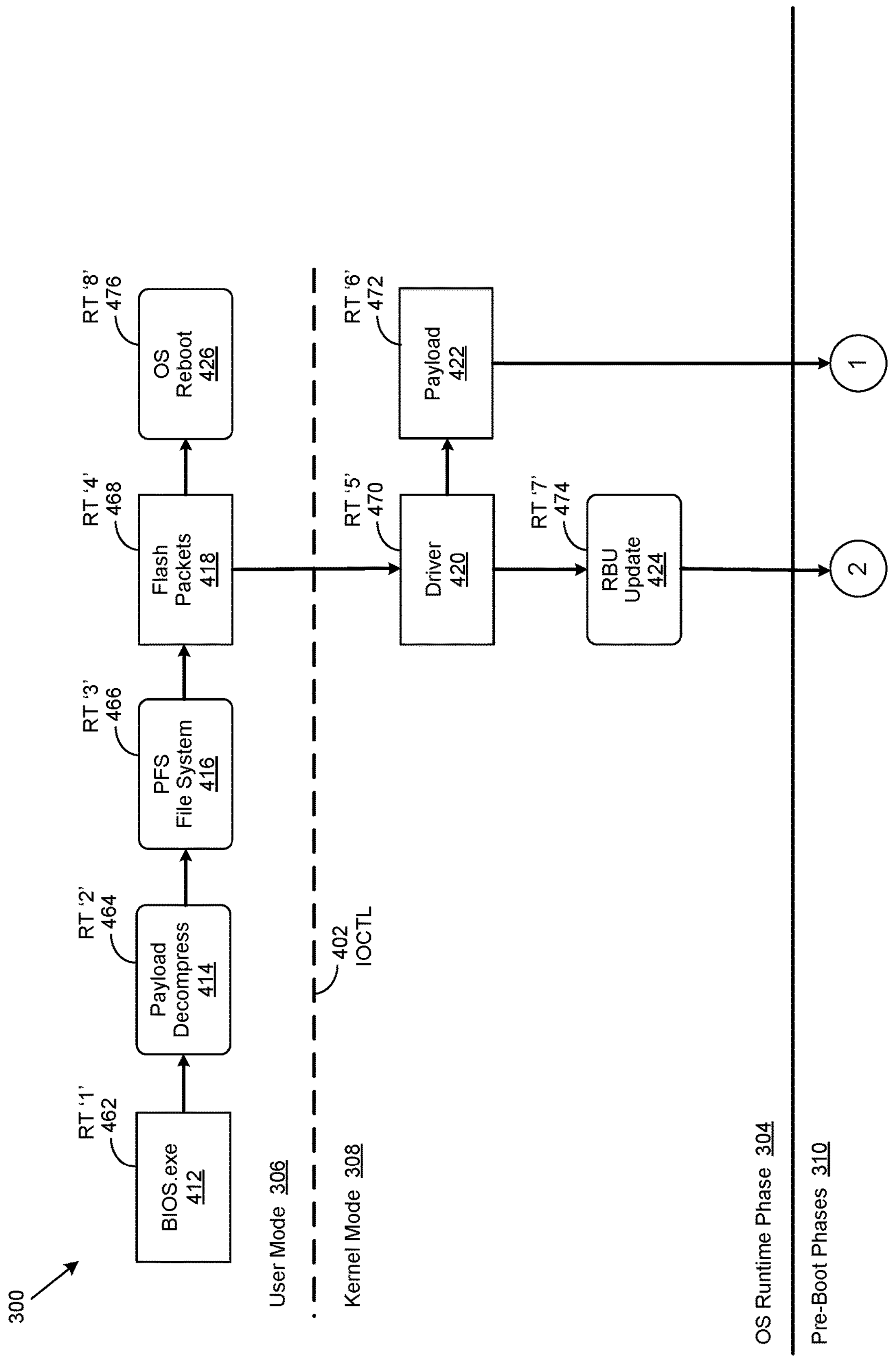
FIGS. 4*a* through 4*c* are a simplified block diagram showing the performance of certain distributed firmware management operations.
Figure 4B:
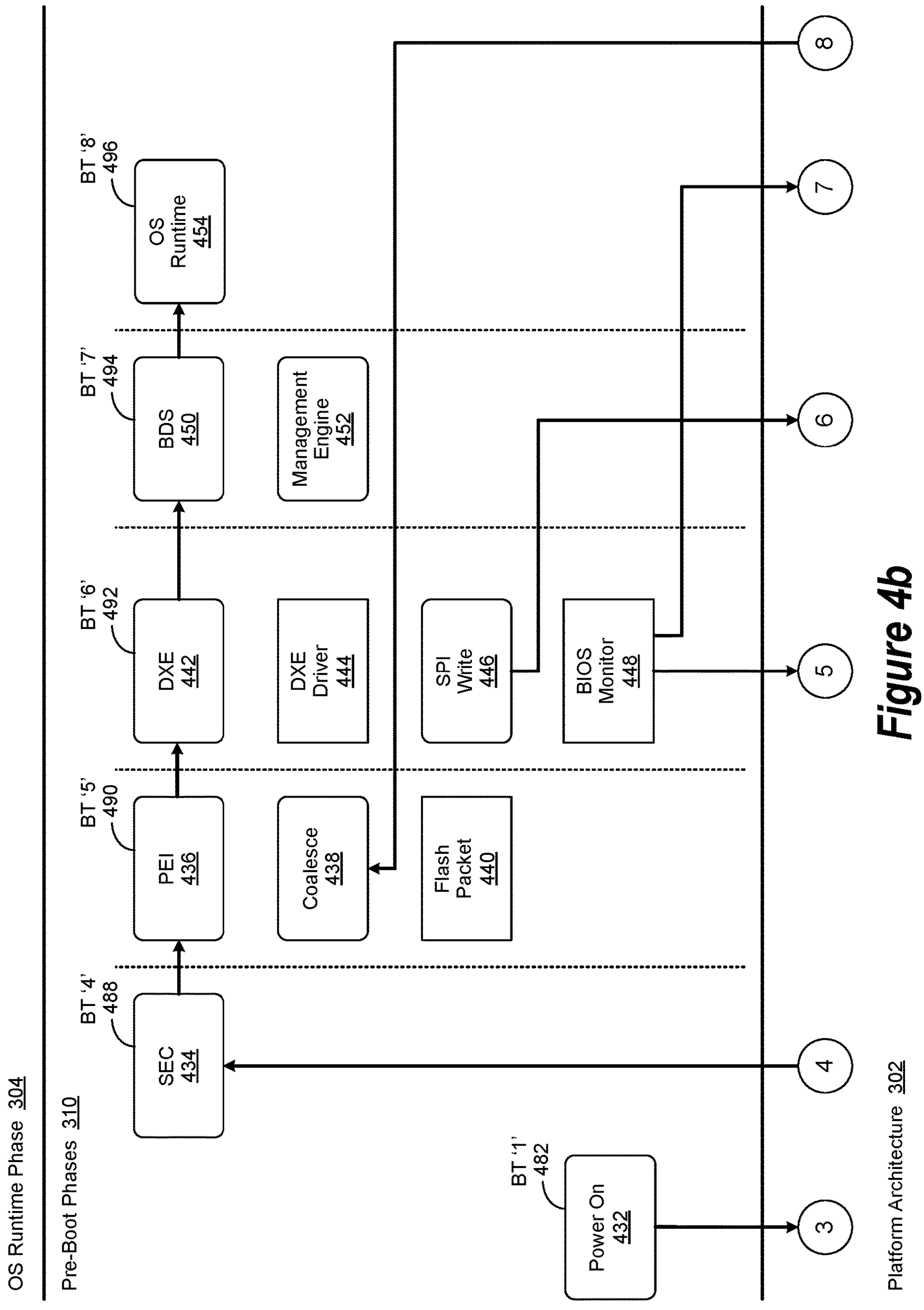
Figure 4C:
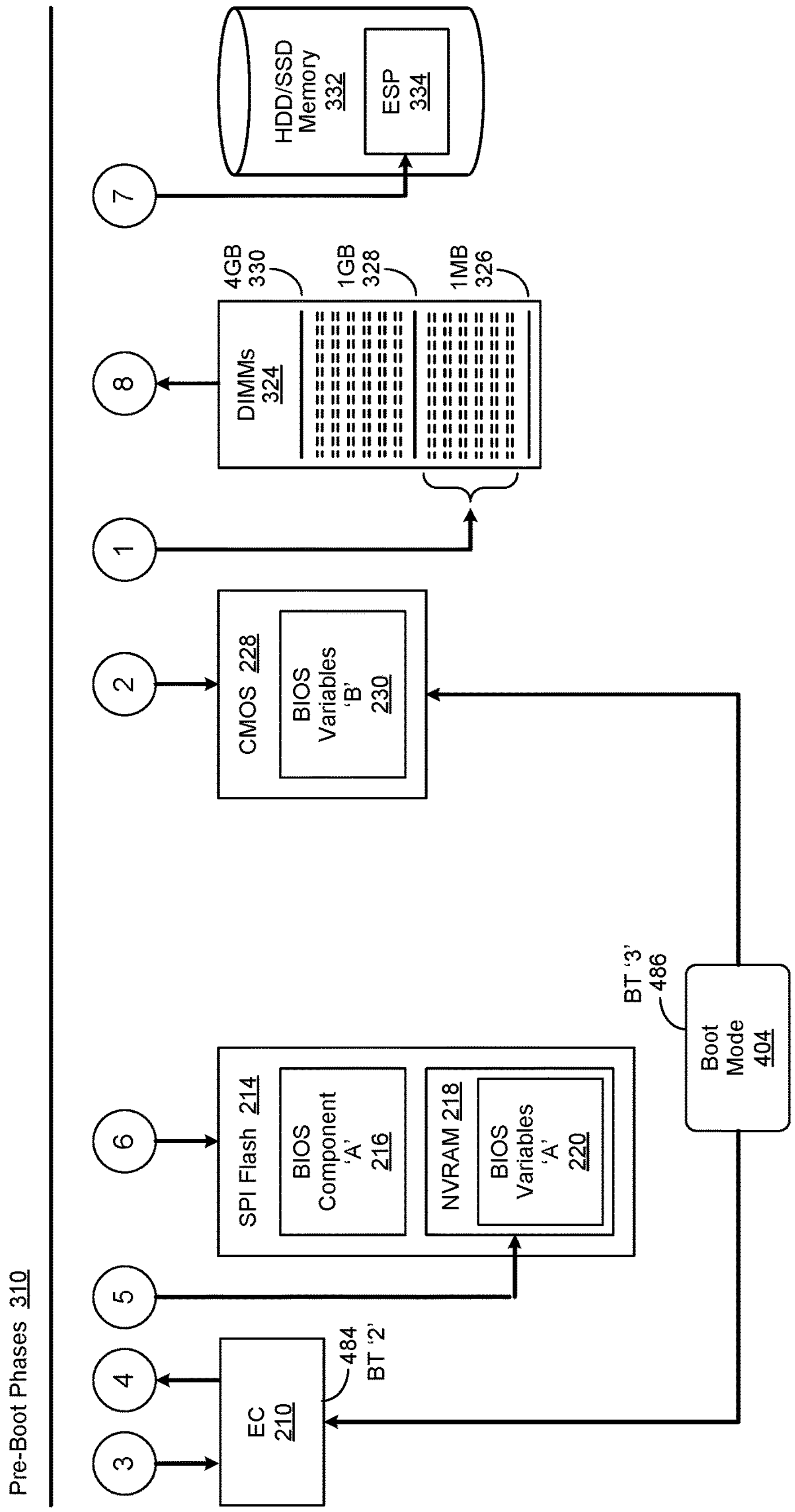

FIGS. 4*a* through 4*c* are a simplified block diagram showing an architecture-specific distributed firmware management platform (ASDFMP) implemented in accordance with an embodiment of the invention to perform certain distributed firmware management operations. In certain embodiments, the ASDFMP 300 may be implemented to include an Operating System (OS) runtime phase 304, various pre-boot phases 310, and a platform architecture 302. In various embodiments, as described in greater detail herein, the platform architecture 302 may be implemented to include an embedded controller (EC) 210, Serial Peripheral Interface (SPI) Flash 214 memory, and a complementary metal-oxide-semiconductor (CMOS) 228 chip, or a combination thereof. In various embodiments, the platform architecture 302 may likewise be implemented to include one or more dual in-line memory modules (DIMMs) 324, and certain hard disk drive (HDD) memory, or solid state drive (SSD) memory, or a combination of the two 332.

In various embodiments, the SPI Flash 214 memory may be implemented to receive, store, manage, and provide access to one or more Basic Input/Output System (BIOS) components 'A' 216, described in greater detail herein. In various embodiments, the SPI Flash 214 memory may likewise be implemented to include certain NVRAM 218 memory, likewise described in greater detail herein. In various embodiments, the NVRAM 218 memory may in turn be implemented to receive, store, manage, and provide access to one or more BIOS variables 'A' 220, as described in greater detail herein.

In various embodiments, the OS runtime phase 304 may be implemented to include a user mode 306 and a kernel mode 308. Skilled practitioners of the art will be aware that user mode 306 generally refers to a restricted mode that limits software access to system resources, while kernel mode 308 generally refers to a privileged mode that allows software to access system resources and perform privileged operations. In various embodiments, an Input/Output Control (IOCTL) 402 operation, familiar to those of skill in the art, may be performed to switch between user mode 306 and kernel mode 308. Those of skill in the art will likewise be aware that such mode switching generally involves saving the current context of an associated information handling system's (IHS's) processor in memory, switching to the new mode, and loading the new context into the processor.

Referring now to FIG. 4*a*, a distributed firmware management operation may be initiated by the ASDFMP 300 receiving a BIOS.exe 412 file in runtime (RT) step '1'. In various embodiments, the BIOS.exe 412 file may be implemented as the combination of a flash memory utility and a payload of firmware components, described in greater detail herein. Then, in RT step '2' 464 the BIOS.exe 412 is executed to decompress 414 its payload, which is then converted in RT step '3' 466 into a payload file system (PFS) 416.

Flash memory packets 418 are then extracted from the PFS 416 if RT step '4' 468 and provided to a memory driver 420 in RT step '5' 470 to create a memory payload 422. The resulting memory payload 422 is then loaded into a lower memory region of one or more DIMMs 324, such as between 1 megabyte (MB) 326 and 1 gigabyte (GB) 328. Thereafter, a Remote BIOS Update (RBU) 424 operation may be performed in RT step '7' to update certain BIOS variables 'B' 230 stored in the CMOS 328 chip. An OS reboot 426 operation is then performed in RT step '8' 476.

Once the OS reboot 426 operation has been performed in RT step '8' 476, power is applied 432 to the ASDFMP 300 in pre-boot time (BT) step '1' 432. An embedded controller (EC) 210 is then invoked in BT step '2' 464 which results in the activation of a boot mode 404 in BT step '3' 486. In various embodiments, the boot mode 404 may be activated in BT step '3' 486 by retrieving, and using, certain BIOS variables 'B' stored in the CMOS 228 chip.

One or more security (SEC) 434 phase operations may then be performed in BT step '4' 488, followed by the performance of one or more Pre Extensible Firmware Interface (EFI) Initialization (PEI) 436 phase operations in BT step '5' 490. In various embodiments, the one or more SEC 434 phase operations may be implemented to secure the boot process by preventing the loading of Unified Extensible Firmware Interface (UEFI) drivers, or boot loaders, that are not signed with an acceptable digital signature. In various embodiments, a trusted platform module (TPM), familiar to skilled practitioners of the art, may be used in the performance of one or more SEC 434 phase operations.

Those of skill in the art will likewise be aware that PEI 436 phase operations are generally performed to initialize permanent memory within a particular IHS to load and invoke initial configuration routines specific to its associated processor environment (PE), described in greater detail herein. In various embodiments, performance of the PEI 436 phase operation in BT step '5' 490 may include one of more packet coalescing 438 operations being performed to coalesce individual flash memory packets previously stored in a low memory region of one or more DIMMs in RT step '6' 472. In various embodiments, the individual flash memory packets may then be stored as one or more coalesced flash memory packets 440.

In various embodiments, a firmware management protocol (FMP) may be used in the performance of a Driver eXecution Environment (DXE) 442 phase operation in BT step 6' 492 to perform an SPI write 446 operation to write the coalesced flash memory packets 440 to SPI Flash 214 memory. Skilled practitioners of the art will be familiar with a DXE 442, which as typically implemented includes a DXE Core, a DXE Dispatcher, and one or more Firmware Management Protocol (FMP) Drivers 444. In general, the DXE Core component is responsible for producing a set of boot services, DXE services, and RT Services. Likewise, the DXE Dispatcher component is responsible for discovering and executing FMP Drivers 444 in the correct order. In turn, the FMP Drivers 444 are responsible for initializing the IHS's processor environment (PE), described in greater detail herein. In various embodiments, the SPI write 446 operation may be performed to write certain flash memory packets associated with certain BIOS components 'A' 216, or certain BIOS variables 'A' 220, or a combination of the two. In various embodiments, the flash memory packets may contain new, updated, modified, revised, or replacement BIOS components 'A' 216, or BIOS variables 'A' 220, or a combination of the two.

In various embodiments, a BIOS monitor 448, such as BIOS IQ, produced by Dell® Incorporated, of Round Rock, Texas, may be implemented within the DXE 442 phase to monitor the current values of certain BIOS variables 'A' 220 stored in NVRAM 218, which in certain embodiments, may be implemented within SPI Flash 214 memory. In various embodiments, the BIOS monitor 448 may likewise be implemented to monitor the status of certain data stored in the ESP 334, described in greater detail herein. Once DXE 442 phase operations are completed in BT step '6' 494, the OS is then booted. In various embodiments, a boot device selection (BDS) 450 phase operation is then performed in BT step '7' 494 to select a boot device. In various embodiments, a management engine (ME) 452, such as the ME 452 produced by Intel® Corporation of Santa Clara, California, may be implemented to use the selected boot device in BT step '8' 496 to boot the ASDFMP 300 into an OS runtime 454 state.

Figure 5A:
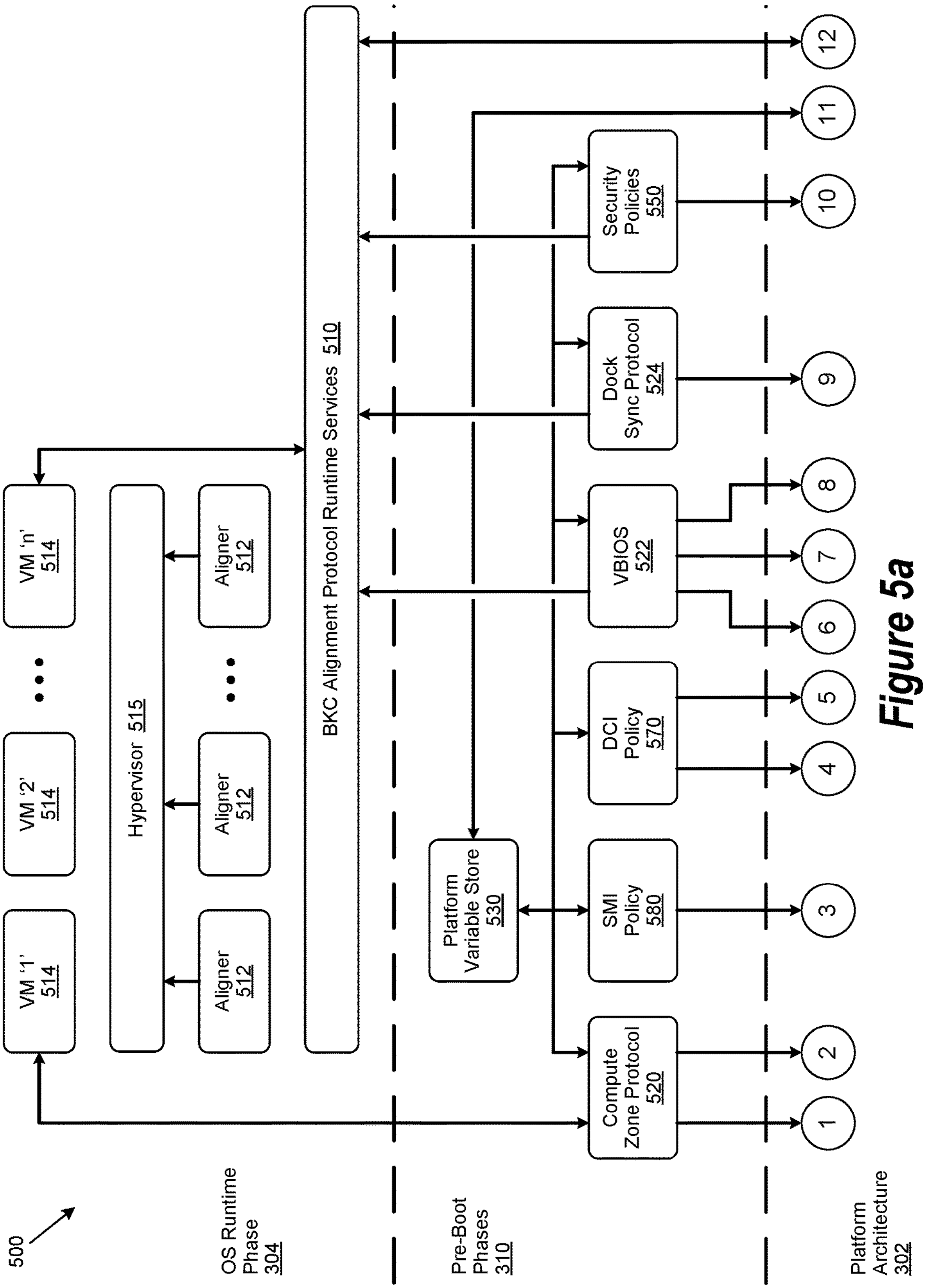
FIGS. 5*a* and 5*b* are a simplified block diagram showing the performance of adaptive context aware information handling system stack tuning operations.
Figure 5B:
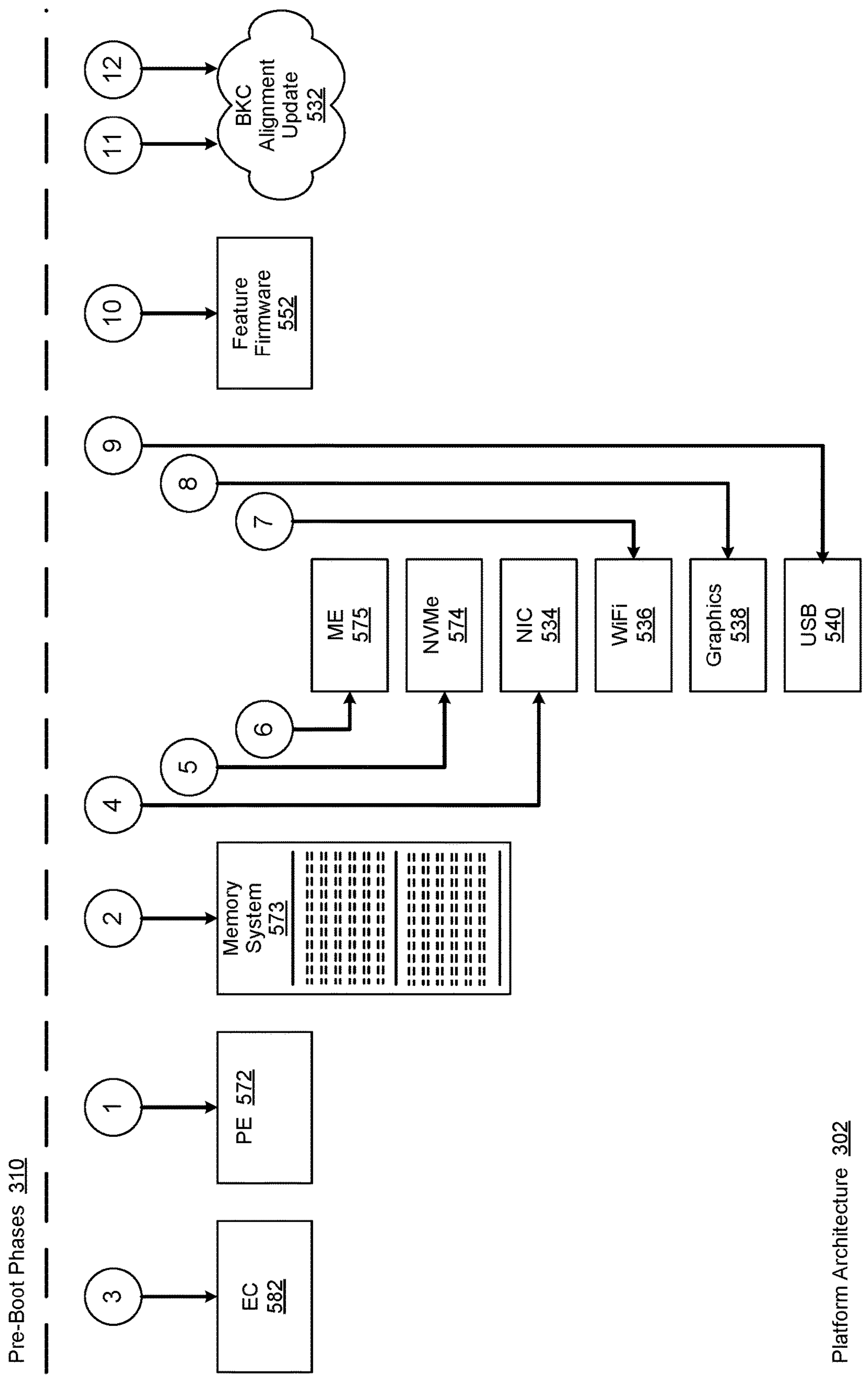

Referring to FIGS. 5*a* and 5*b*, a simplified block diagram of an information handling system stack tuning operation 500 is shown. In certain embodiments, a firmware management operation includes the information handling system stack tuning operation. In certain embodiments, the information handling system stack tuning operation includes a context aware information handling system stack tuning operation. In certain embodiments, the information handling system stack tuning operation includes an adaptive context aware information handling system stack tuning operation.

As used herein, an information handling system stack tuning operation broadly refers to any task, function, operation, procedure, or process performed, directly or indirectly, to adjust one or more stack components of a software stack of an information handling system to enhance the functioning of the information handling system, described in greater detail herein. As used herein, a context aware information handling system stack tuning operation broadly refers to any task, function, operation, procedure, or process performed, directly or indirectly, adjust, based upon a context of the information handling system, one or more stack components of a software stack of an information handling system to enhance the functioning of the information handling system, described in greater detail herein. As used herein, an adaptive context aware information handling system stack tuning operation broadly refers to any task, function, operation, procedure, or process performed, directly or indirectly, to adjust based upon one or more conditions associated with the information handling system environment and a context of the information handling system, one or more stack components of a software stack of an information handling system to enhance the functioning of the information handling system, described in greater detail herein.

In certain embodiments, a stack tuning system performs the context aware stack tuning operation. In certain embodiments, the context aware stack tuning operation includes a dynamic learning method (DLM) which learns various platform capabilities like operating system drivers, processor environment specific firmware, etc. that can influence runtime execution. In certain embodiments, the dynamic learning method generates a best known configuration alignment policy. In certain embodiments, the dynamic learning method publishes the best known configuration alignment policy for use by other information handling systems conforming to similar information handling system policy architectures.

In certain embodiments, the context aware stack tuning operation uses an adaptive best known configuration tuning protocol. In certain embodiments, the adaptive best known configuration tuning protocol allows the context aware stack tuning operation to perform seamless updates. In certain embodiments, the seamless updates automatically tune the best known configuration parameters of the information handling system.

In certain embodiments, the context aware stack tuning operation uses an embedded controller to perform seamless updates. In certain embodiments, the embedded controller performs an out of band non-volatile memory connect operation. In certain embodiments, the embedded controller accesses remote storage (e.g., via cloud synchronization) upon activation of a best known configuration update trigger. In certain embodiments, the context aware stack tuning operation incorporates a cloud module which facilitates alignment of tuned stack information across a plurality of information technology (IT) environments.

In certain embodiments, the context aware stack tuning operation is processor environment agnostic. In certain embodiments, the best known configuration policy seamlessly triggers best known configuration updates. In certain embodiments, the context aware stack tuning operation resolves power on self test (POST) and system performance issues for the information handling system. In certain embodiments, the context aware stack tuning operation includes a protocol designed to align all modules and respective updates. In certain embodiments, the protocol is executed in a pre-boot environment. In certain embodiments, the protocol allows seamless and enhanced user-experience.

In certain embodiments, by the context aware stack tuning operation uses an embedded controller which performs an out of band non-volatile memory connect operation. In certain embodiments, the embedded controller includes an out of band non-volatile memory interface. In certain embodiments, the out of band non-volatile memory interface auto triggers a best known configuration update.

Referring now to FIGS. 5*a* and 5*b*, a context aware stack tuning operation, described in greater detail herein, may be initiated by actuation of a best known configuration protocol runtime service 510. The best known configuration run time service 510 then accesses a plurality of stack related storage locations to retrieve stack related information. In certain embodiments, the best known configuration run time service 510 uses the retrieved stack related information to generate one or more protocol aligner components 512. In certain embodiments, best known configuration run time service 510 communicates with one or more virtual machines 514. In certain embodiments, the protocol aligner components 512 communicate with the virtual machines 514 via a hypervisor 515. In certain embodiments, the one or more virtual machines 514 are executing on a particular processor environment. In certain embodiments, the best known configuration protocol runtime service 510 executes in a runtime phase. In certain embodiments, one or more of the stack related storage locations are generated during a pre-boot phase.

In certain embodiments, the plurality of stack related storage locations includes a compute zone stabilization protocol module 520, a virtual BIOS module 522, a dock synchronization module 524, or a combination thereof. In certain embodiments, the plurality of stack related storage locations include a platform variable store module 530. In certain embodiments, information contained within the platform variable store module 530 may be used to generate a best known configuration alignment update 532. In certain embodiments, the best known configuration alignment update 532 includes a best known configuration alignment protocol.

In certain embodiments, the compute zone stabilization protocol module 520 is associated with a processor environment 572, a memory system 573, a management engine 575, or a combination thereof. In certain embodiments, the virtual BIOS module 522 is associated with a network interface controller 534, a WiFi device 536, a graphics component 538, or a combination thereof. In certain embodiments, the dock synchronization module 524 is associated with an input/output device 540 such as a universal serial bus device.

In certain embodiments, the platform variable store module 530 stores a configuration dataset. In certain embodiments, the configuration dataset includes configuration information for a plurality of components of the information handling system. In certain embodiments, the configuration for the plurality of components includes a policy 570 for a direct connect interface (DCI). In certain embodiments, the policy 570 for the direct connect interface is associated with a processor environment 572, a non-volatile memory 574 or a combination thereof. In certain embodiments, the configuration information includes security policy information 550. In certain embodiments, the security polity information 550 is associated with a feature firmware component 552. In certain embodiments, the configuration information includes system management interrupt (SMI) policy information 580. In certain embodiments, the system management interrupt policy information 580 is associated with an embedded controller 582. In certain embodiments, the embedded controller 582 includes an extended embedded controller.

In certain embodiments, when performing a context aware stack tuning operation 500, different versions of the modules are monitored and controlled by the platform variable store module 530 which is maintained in the pre-boot state. In certain embodiments, best known configuration alignment protocol runtime service 510 communicates with platform variable store module 530, responsible to update the virtual machines 514 which have associated protocol aligner components 512. In certain embodiments, best known configuration alignment protocol runtime service 510 communicates with the modules to obtain different versions of the stack attributes.

By providing a best known configuration alignment protocol during run-time environment assures the required version of the stack attributes are availed to the virtual machines 514 for smooth and un-interrupted functioning.

In certain embodiments, the best known configuration alignment protocol aligns the different modules into a required dependency. This alignment makes it possible for smooth functioning of the virtual machines 514. A copy of the best known configuration alignment protocol is maintained within the best known configuration alignment storage location. In certain embodiments, the best known configuration alignment storage location is located in a data center such as a cloud data center.

In certain embodiments, different stack components of the best known configuration stack are tracked through version details in a version pool. In certain embodiments, different related stack components are combined to provide a combined stack component. In certain embodiments, the different related stack components can include BIOS stack components, embedded controller stack components, non-volatile memory stack components, or a combination thereof, which are combined to provide a combined firmware stack component. In certain embodiments, a latest updated version of the combined stack component is pooled in the version pool separately. In certain embodiments, the version pool is maintained within the platform variable store module 530. Accordingly, each module contributes to the version pool and same is tracked via a system architecture tag for each attribute version. During the process of migration, the version number is obtained from the pool, rather the actual modules. In certain embodiments, obtaining the version number supports fetching the appropriate version, resulting in smooth and flawless transition of virtual machines with very minimal time and cost.

In certain embodiments, when performing a context aware stack tuning operation 500, a stable configuration (also referred to as a golden configuration) is identified and stored within the non-volatile memory 574. In certain embodiments, the system is tuned using the best known configuration attributes stored within the non-volatile memory 574. Tuning protocol and a copy of the same will be tagged with a respective system architecture and is stored at the remote storage location.

In certain embodiments, during a catastrophic failure event (i.e., a no boot status) of the system, the embedded controller 582 communicates with the remote storage location to obtain a copy of the stable configuration for the particular system architecture and adapt the stable configuration for recovery or update to bring the information handling system back to an operational status. Accordingly, the best known configuration attribute tuning protocol learns and communicates with remote storage location to obtain the stable configuration and to also note of any faulty version updates.

Figure 6:
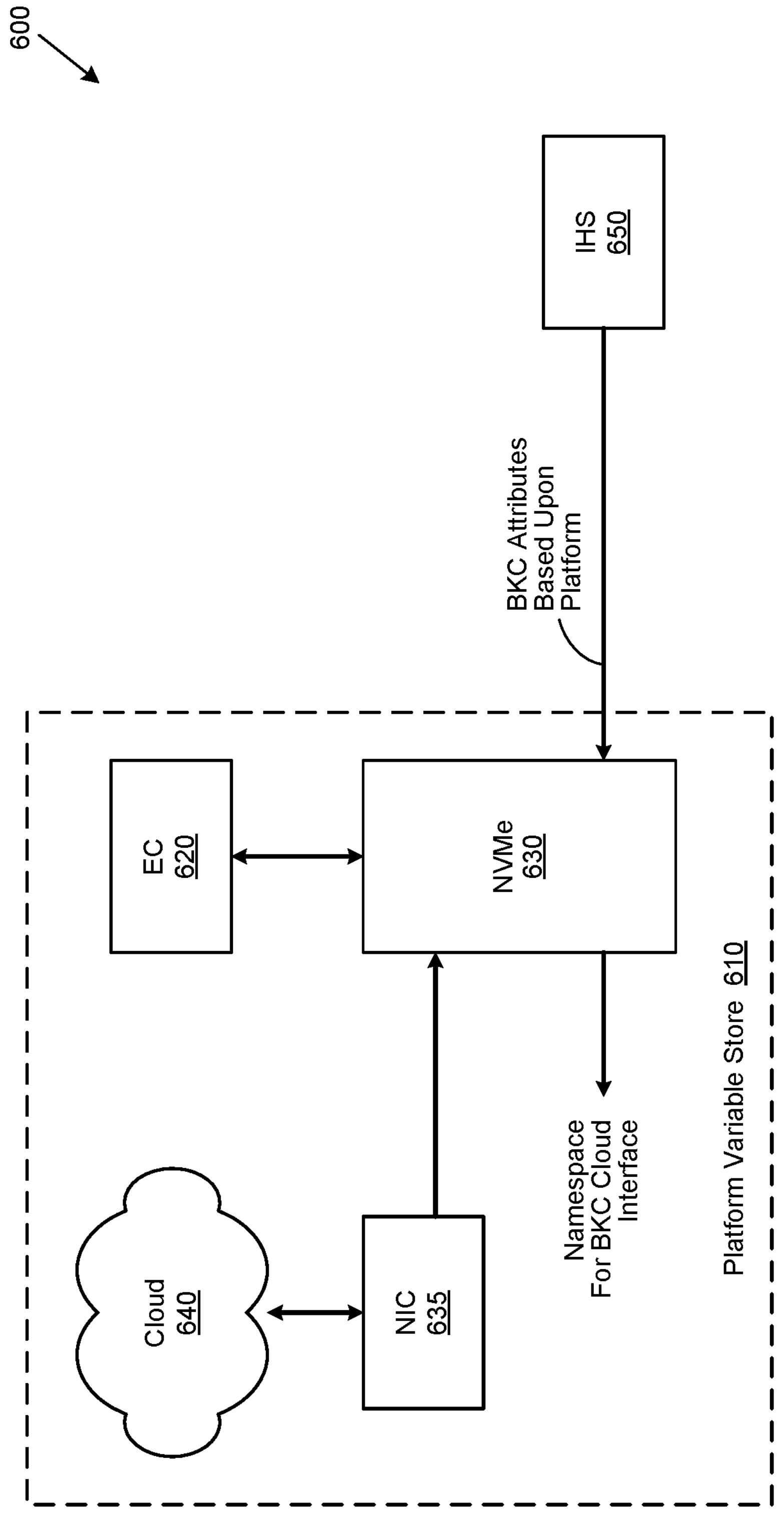
FIG. 6 is a simplified block diagram of a stack tuning environment.

Referring now to FIG. 6, a simplified block diagram of a stack tuning environment 600 is shown. In certain embodiments, the stack tuning environment 600 performs a stack tuning operation. In certain embodiments, the stack tuning environment 600 includes a platform variable store system 610. In certain embodiments, the platform variable store system 610 includes an embedded controller 620, a non-volatile memory portion 630, a network interface controller (NIC) 635, a remote storage portion 640, or a combination thereof. In certain embodiments, the stack tuning environment 600 includes one or more information handling systems 650. In certain embodiments, the one or more information handling systems 650 correspond to one or more respective information handling system architectures. In certain embodiments, the information handling system architectures may be associated with various lines of business of an information handling system supplier. In certain embodiments, the information handling system architectures may include respective best known configuration (BKC) information handling system stacks.

In various embodiments, one or more context aware stack tuning operations may be performed to allow the ASDFMP 300 to achieve context awareness of which stack components are present in the information handling system software stack. In various embodiments, one or more context aware stack tuning operations may be performed to allow the ASDFMP 300 to achieve context awareness of which stack components tuning should be prioritized. In various embodiments, one or more context aware stack tuning operations may be performed to allow the ASDFMP 300 to achieve context awareness of user preferences, hardware operating state, system availability, and so forth. As used herein, context awareness broadly refers to a capability of the ASDFMP 300 to sense and react based upon information associated with the information handling system environment. As used herein, adaptive context awareness broadly refers to a capability of the ASDFMP 300 to sense and react based upon information associated with the information handling system environment which adjusts based upon one or more conditions associated with the information handling system environment.

In certain embodiments, the context aware stack tuning operation includes a stack tuning remote access operation. As used herein, a stack tuning remote access operation broadly refers to a firmware management operation, described in greater detail herein, performed directly, or indirectly, within a multi-processor operating environment 200 to adjust one or more stack components of a software stack of an information handling system to enhance the functioning of the information handling system, where at least some of the information used to adjust the one or more stack components is obtained from a remote storage device, described in greater detail herein.

In certain embodiments, when performing the stack tuning remote access operation, all best known configuration attributes are initially saved in non-volatile memory of the non-volatile memory portion 630. Next the best known configuration attributes saved within the non-volatile memory are synchronized to the latest best known configuration attributes from the remote storage portion 640.

In certain embodiments, the non-volatile memory portion 630 is connected to the remote storage portion 640 via the network interface controller 635. In certain embodiments, best known configuration attributes for a particular information handling system are exported to the remote storage location 640. In certain embodiments, best known configuration attributes for a particular information handling system are stored at the remote storage location using a system architecture identifier as a tag. In certain embodiments, the system architecture identifier is associated with a line of business, or portion of a line of business, of an information handling system supplier.

In certain embodiments, the embedded controller 620 receives best known configuration information from the remote storage location 640. In certain embodiments, synchronized best known attributes are monitored by the embedded controller 620. In certain embodiments, the synchronized best known attributes are monitored by the embedded controller 620, out of band. In certain embodiments, the embedded controller triggers a stack update action when there is a discrepancy between the best known attributes stored in the non-volatile memory portion 630 and the best known attributes stored in the remote storage location 640.

Accordingly, data populated in the remote storage portion 640 are always aligned with attributes for the latest release version of all the dependent modules. In certain embodiments, when a user posts a resolution to an issue or problem with a particular system architecture, the tag for the system architecture may be used to identify the system architecture and revise the information stored in the remote storage location 640 to the latest version of the attributes. When another user identifies an issue with similar system architecture, the user can resolve their issue by aligning their configuration to the latest best known configuration for the system architecture which may have been updated by the previous user.

Figure 7:
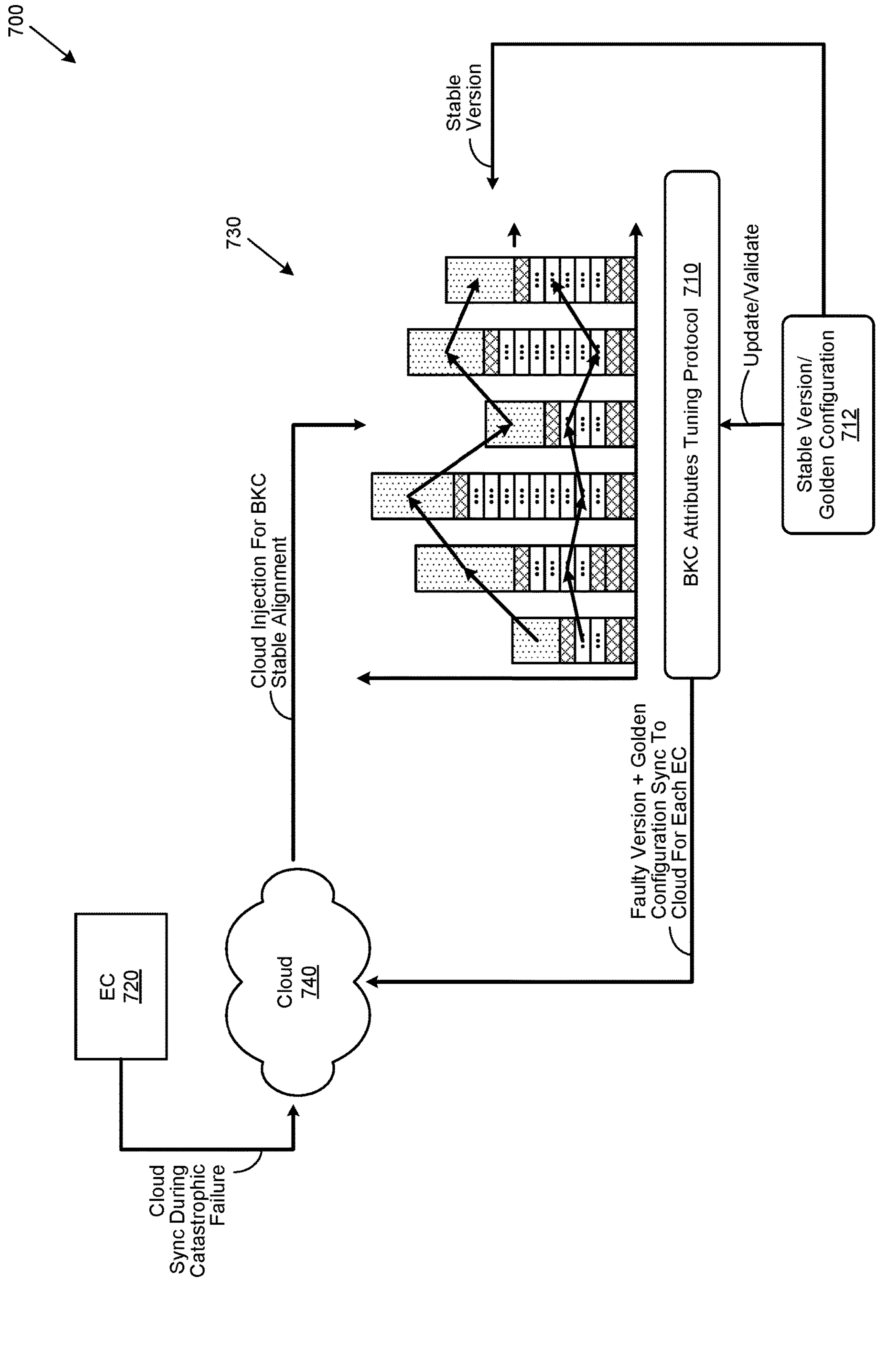
FIG. 7 is a simplified block diagram of a stack tuning attribute protocol operation; and, FIG. 8 is a simplified block diagram of a tuned information handling system stack.

Referring to FIG. 7, a simplified block diagram of a stack attribute tuning protocol operation 700 is shown. As used herein, a stack attribute tuning protocol operation broadly refers to any task, function, operation, procedure, or process performed, directly or indirectly, to adjust one or more stack attributes of an information handling system to enhance the functioning of the information handling system, described in greater detail herein.

In certain embodiments, when performing the stack attribute tuning operation 700, a runtime best known configuration tuning protocol (BTP) 710 identifies any miss aligned best known configuration stack attributes for any of a plurality of stack components. In certain embodiments, the identification is based upon comparison with a stable configuration 712 (also referred to as a golden configuration) of the best known configuration stack attributes.

In certain embodiments, the stack attribute tuning operation 700 accesses configuration information of the plurality of stack components. In certain embodiments, the configuration information includes stack component version information and system configuration data set attributes. In certain embodiments, the stack attribute tuning operation uses the embedded controller 720 to construct a table of best known configuration checks. In certain embodiments, the best known configuration tuning protocol 710 provides a runtime mechanism which acquires knowledges about discrepancies within the best known configuration stack. In certain embodiments, the best known configuration tuning protocol 710 detects mis-aligned attributes and notifies the embedded controller 720 to update the table for table of best known configuration checks. In certain embodiments, the best known configuration tuning protocol 710 enables the system to maintain alignment and compatibility between firmware, drivers, and platform configurations for optimal performance.

In certain embodiments, the embedded controller 720 dynamically scans and alerts update modules 730. In certain embodiments, some or all of the update modules 730 are instantiated within a best known configuration alignment protocol runtime service such as best known configuration alignment protocol runtime service 510. In certain embodiments, the embedded controller 720 alerts update modules 730 with information regarding any miss aligned drivers. In certain embodiments, the uses telemetry regarding the information handling system configuration to identify any miss aligned drivers. In certain embodiments, the embedded controller 720 publishes the tuned attributes to a remote storage location 740 for a platform peak performance. In certain embodiments, the embedded controller 720 is responsible for dynamically scanning the system's components and alerting update modules when inconsistencies or mismatches in the installed drivers are identified. In certain embodiments, the embedded controller 720 performs telemetry functions to collect relevant data. Once discrepancies are detected, the embedded controller 720 notifies the update modules 730 and facilitates rectification of the identified issues.

In certain embodiments, the stack attribute tuning protocol operation 700 includes a best known configuration learning operation. As used herein, a best known configuration learning operation broadly refers to any task, function, operation, procedure, or process performed, directly or indirectly, to learn a best known configuration of one or more stack components of a software stack of an information handling system to enhance the functioning of the information handling system, described in greater detail herein. In certain embodiments, the best known configuration learning operation publishes stable stack synchronization information for an information handling system architecture to a remote storage location. In certain embodiments, the remote storage location includes storage for a global platform pool (e.g., stack synchronization information for a plurality of information handling system architectures). In certain embodiments, the best known configuration learning operation includes a knowledge acquisition process that uses remote resources to achieve stable stack synchronization across the global platform pool. In certain embodiments, the knowledge acquisition process includes collecting data about firmware, drivers, and platform configurations and the stable versions of the plurality of stack components. Once this knowledge is gathered, the information is published to a remote storage location, enabling multiple systems across a global platform pool to access and synchronize their best known configuration stacks and to self-heal in a case of a detected corruption. Accordingly, the best known configuration learning operation ensures that all platforms within the pool maintain a consistent and stable configuration, enhancing reliability and performance across the entire ecosystem.

Figure 8:
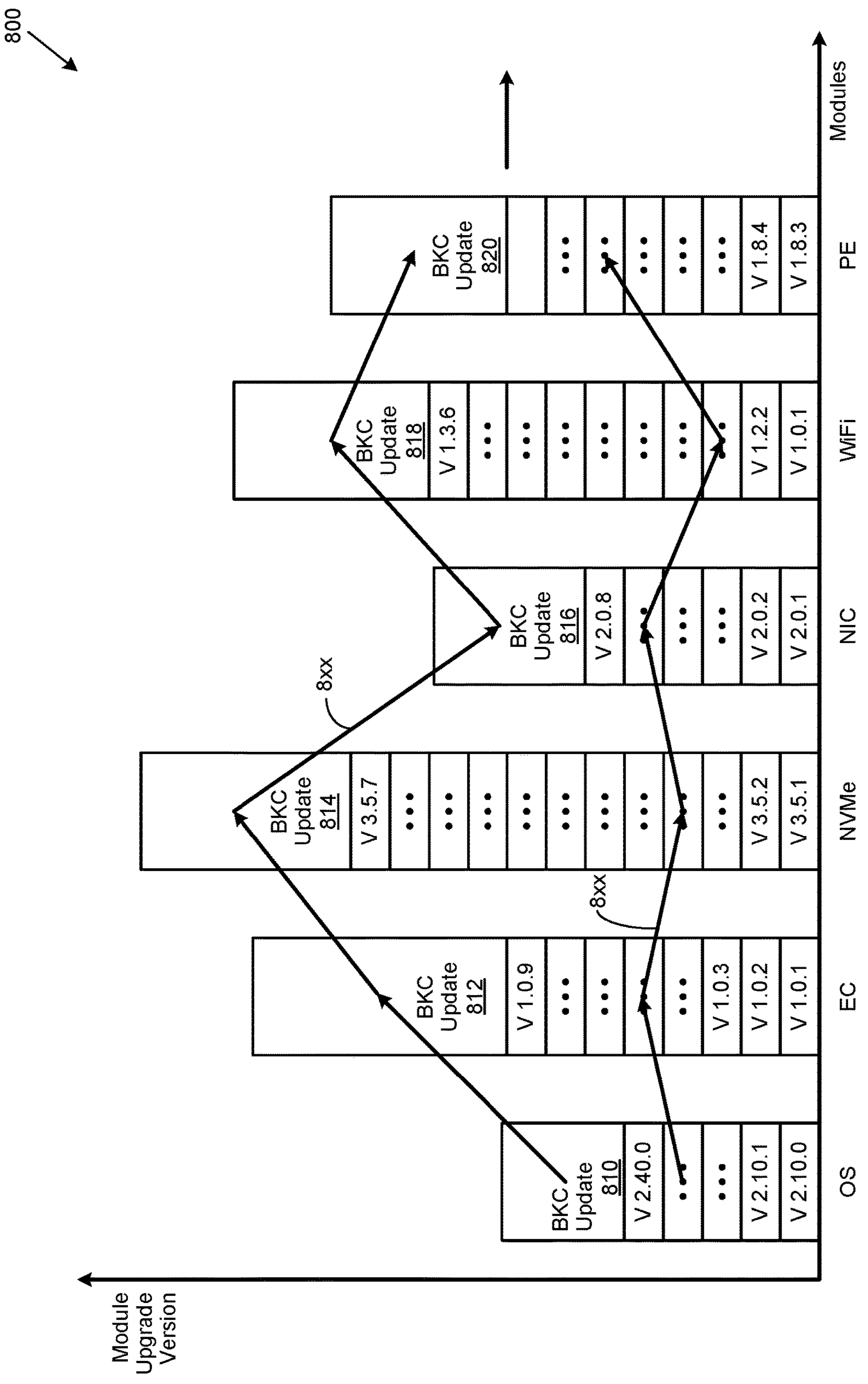

Referring to FIG. 8, simplified block diagram of a tuned information handling system stack 800 is shown. In certain embodiments, the tuned information handling system software stack 800 includes a plurality of stack components. As used herein, an information handling system software stack broadly refers to a set of independent components that work together to support the operation of the information handling system. In certain embodiments, the set of independent components include operating system components, architectural layers, protocols, runtime environments, databases and functions calls. In certain embodiments, the set of components are arranged in a hierarchy. In certain embodiments, the hierarchical arrangement of the set of components is stacked on top of each other. In certain embodiments, lower level components, such as firmware components interact with hardware of the information handling system. In certain embodiments, higher level components, such as operating system components, perform specific tasks and servers for an end user. In certain embodiments, various components of the set of components communicate directly with an application via a series of instructions that traverse the information handling system software stack.

As used herein, a tuned information handling system software stack broadly refers to a set of independent components that work together to support the operation of the information handling system, where each of the components of the set of independent components have been configured to provide a best known configuration for a particular information handing system architecture. As used herein, best known configuration broadly refers to an information handling system configuration which includes a set of information handling system components which are aligned to provide seamless (i.e., error free) performance of the information handling system. In various embodiments, the set of information handling system components include versions of each of the set of information handling system components which function together to provide seamless performance of the information handling system.

In certain embodiments, the set of versions of each of the set of information handling system components include versions of each of a set of stack components of a software stack for a particular information handling system architecture.

In certain embodiments, the plurality of stack components include an operating system stack component 810, an embedded controller stack component 812, a non-volatile memory firmware stack component 814, a network interface controller stack component 816, a wireless interface stack component 818, a processor environment stack component 820, or a combination thereof.

As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a firmware management operation, comprising:

providing an information handling system with an architecture-specific distributed firmware management platform (ASDFMP) and a distributed BIOS, the distributed BIOS including a BIOS component and a BIOS variable, the distributed BIOS being implemented to function with any of a plurality of processor environments, the architecture-specific distributed firmware management platform being implemented to accommodate architecture-specific aspects of the information handling system;

identifying a processor environment installed on the information handling system from the plurality of processor environments; and, performing an information handling system stack tuning operation, the information handling system stack tuning operation providing a set of tuned stack components, the set of tuned stack components being tuned for the processor environment installed on the information handling system.

2. The method of claim 1, wherein:

the tuning is performed by an embedded controller, the embedded controller tuning the set of tuned stack components to provide a best known configuration for a particular information handling system architecture, the best known configuration for the particular information handling system architecture providing the information handling system with seamless operation which is error free.

3. The method of claim 2, wherein:

the embedded controller performs an out of band non-volatile memory connection operation when tuning the tuned set of stack components.

4. The method of claim 1, wherein:

the information handling system stack tuning operation includes a dynamic learning method, the dynamic learning method generating a configuration policy, the configuration policy seamlessly triggering a configuration update which is error free.

5. The method of claim 1, wherein:

the information handling system stack tuning operation includes a context aware information handling system stack tuning operation.

6. The method of claim 5, wherein:

context awareness considers one or more of a user context, a system configuration context, and a system resource availability context.

7. A system comprising:

a processor;

a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for:

providing an information handling system with an architecture-specific distributed firmware management platform (ASDFMP) and a distributed BIOS, the distributed BIOS including a BIOS component and a BIOS variable, the distributed BIOS being implemented to function with any of a plurality of processor environments, the architecture-specific distributed firmware management platform being implemented to accommodate architecture-specific aspects of the information handling system;

identifying a processor environment installed on the information handling system from the plurality of processor environments; and, performing an information handling system stack tuning operation, the information handling system stack tuning operation providing a set of tuned stack components, the set of tuned stack components being tuned for the processor environment installed on the information handling system.

8. The system of claim 7, wherein:

the tuning is performed by an embedded controller, the embedded controller tuning the set of tuned stack components to provide a best known configuration for a particular information handling system architecture, the best known configuration for the particular information handling system architecture providing the information handling system with seamless operation which is error free.

9. The system of claim 8, wherein:

the embedded controller performs an out of band non-volatile memory connection operation when tuning the tuned set of stack components.

10. The system of claim 7, wherein:

the information handling system stack tuning operation includes a dynamic learning method, the dynamic learning method generating a configuration policy, the configuration policy seamlessly triggering a configuration update which is error free.

11. The system of claim 7, wherein:

the information handling system stack tuning operation includes a context aware information handling system stack tuning operation.

12. The system of claim 11, wherein:

context awareness considers one or more of a user context, a system configuration context, and a system resource availability context.

13. A non-transitory, computer-readable storage medium embodying computer program code, the computer program code comprising computer executable instructions configured for:

providing an information handling system with an architecture-specific distributed firmware management platform (ASDFMP) and a distributed BIOS, the distributed BIOS including a BIOS component and a BIOS variable, the distributed BIOS being implemented to function with any of a plurality of processor environments, the architecture-specific distributed firmware management platform being implemented to accommodate architecture-specific aspects of the information handling system;

identifying a processor environment installed on the information handling system from the plurality of processor environments; and, performing an information handling system stack tuning operation, the information handling system stack tuning operation providing a set of tuned stack components, the set of tuned stack components being tuned for the processor environment installed on the information handling system.

14. The non-transitory, computer-readable storage medium of claim 13, wherein:

the tuning is performed by an embedded controller, the embedded controller tuning the set of tuned stack components to provide a best known configuration for a particular information handling system architecture, the best known configuration for the particular information handling system architecture providing the information handling system with seamless operation which is error free.

15. The non-transitory, computer-readable storage medium of claim 14, wherein:

the embedded controller performs an out of band non-volatile memory connection operation when tuning the tuned set of stack components.

16. The non-transitory, computer-readable storage medium of claim 13, wherein:

the information handling system stack tuning operation includes a dynamic learning method, the dynamic learning method generating a configuration policy, the configuration policy seamlessly triggering a configuration update which is error free.

17. The non-transitory, computer-readable storage medium of claim 13, wherein:

the information handling system stack tuning operation includes a context aware information handling system stack tuning operation.

18. The non-transitory, computer-readable storage medium of claim 17, wherein:

context awareness considers one or more of a user context, a system configuration context, and a system resource availability context.

19. The non-transitory, computer-readable storage medium of claim 13, wherein:

the computer executable instructions are deployed to a client system from a server system at a remote location.

20. The non-transitory, computer-readable storage medium of claim 13, wherein:

the computer executable instructions are provided by a service provider to a user on an on-demand basis.

* * * * *